US012381301B2

(12) United States Patent
Li et al.

(10) Patent No.: US 12,381,301 B2
(45) Date of Patent: Aug. 5, 2025

(54) ADAPTER DEVICE COMPRISING A COAXIAL CABLE COUPLED TO AN AIR-DIELECTRIC MICROSTRIP AND INCLUDING A NON-FLAT CAPACITIVE COUPLING FORMED BY A NON-FLAT GROUND PLANE WITH A NON-FLAT METAL PART

(71) Applicant: Huawei Technologies Co., Ltd., Shenzhen (CN)

(72) Inventors: Chaochao Li, Xi'an (CN); Chunliang Xu, Xi'an (CN); Weimin Li, Xi'an (CN); Jiejun Zhou, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 267 days.

(21) Appl. No.: 18/153,941

(22) Filed: Jan. 12, 2023

(65) Prior Publication Data

US 2023/0155295 A1 May 18, 2023

Related U.S. Application Data

(63) Continuation of application No. PCT/CN2021/105095, filed on Jul. 8, 2021.

(30) Foreign Application Priority Data

Jul. 13, 2020 (CN) ......................... 202010670111.9

(51) Int. Cl.

| | |
|---|---|
| ***H01P 5/08*** | (2006.01) |
| ***H01Q 13/10*** | (2006.01) |
| ***H01Q 13/18*** | (2006.01) |

(52) U.S. Cl.
CPC ........... *H01P 5/085* (2013.01); *H01Q 13/106* (2013.01); *H01Q 13/18* (2013.01)

(58) Field of Classification Search
CPC ........................................................ H01P 5/085
USPC .................................................. 333/33, 24 C
See application file for complete search history.

(56) References Cited

U.S. PATENT DOCUMENTS

| | | | | |
|---|---|---|---|---|
| 4,656,441 | A * | 4/1987 | Takahashi et al. | H01P 5/085 333/260 |
| 8,704,725 | B2 | 4/2014 | Xu et al. | |
| 10,594,014 | B2 | 3/2020 | Wakita et al. | |
| 2004/0161973 | A1 | 8/2004 | Laub et al. | |
| 2006/0255877 | A1 * | 11/2006 | Jiang et al. | H05K 1/0243 333/260 |
| 2012/0244727 | A1 | 9/2012 | Harel et al. | |

(Continued)

FOREIGN PATENT DOCUMENTS

| | | | |
|---|---|---|---|
| CN | 102208710 | A | 10/2011 |
| CN | 102334232 | A | 1/2012 |

(Continued)

*Primary Examiner* — Benny T Lee
(74) *Attorney, Agent, or Firm* — SLATER MATSIL, LLP

(57) ABSTRACT

An adapter device, a feeder device, and an antenna are provided. The adapter device includes a coaxial cable, an air dielectric microstrip, a ground plane, and a non-flat metal part. An outer conductor of the coaxial cable is electrically connected to the non-flat metal part, the non-flat metal part and the ground plane form non-flat capacitive coupling, and an inner conductor of the coaxial cable is electrically connected to the air dielectric microstrip. The outer conductor of the coaxial cable is grounded.

20 Claims, 6 Drawing Sheets

Adapter device 300

(56) References Cited

U.S. PATENT DOCUMENTS

| | | | | |
|---|---|---|---|---|
| 2012/0274535 | A1 | 11/2012 | Deavours | |
| 2013/0135166 | A1 | 5/2013 | Lenart et al. | |
| 2014/0225686 | A1 | 8/2014 | Bonczyk | |
| 2017/0347446 | A1 * | 11/2017 | Fisné et al. | H01P 3/08 |
| 2019/0044258 | A1 | 2/2019 | Everest et al. | |

FOREIGN PATENT DOCUMENTS

| | | | |
|---|---|---|---|
| CN | 204348913 | U | 5/2015 |
| CN | 108172981 | A | 6/2018 |
| CN | 108780939 | A | 11/2018 |
| WO | 2019032366 | A1 | 2/2019 |

* cited by examiner

ADAPTER DEVICE COMPRISING A COAXIAL CABLE COUPLED TO AN AIR-DIELECTRIC MICROSTRIP AND INCLUDING A NON-FLAT CAPACITIVE COUPLING FORMED BY A NON-FLAT GROUND PLANE WITH A NON-FLAT METAL PART

CROSS-REFERENCE TO RELATED APPLICATIONS

This application is a continuation of International Application No. PCT/CN2021/105095, filed on Jul. 8, 2021, which claims priority to Chinese Patent Application No. 202010670111.9, filed on Jul. 13, 2020. The disclosures of the aforementioned applications are hereby incorporated by reference in their entireties.

TECHNICAL FIELD

This application relates to the field of antenna designs, and more specifically, to an adapter device, a feeder device, and an antenna.

BACKGROUND

In a feeder device of a base station antenna, a radio frequency signal often needs to be transmitted from a coaxial cable to an air dielectric microstrip, that is, the signal is transferred between the coaxial cable and the air dielectric microstrip. In an existing design, a cavity (or a reflection panel, namely, a ground plane) accommodating an air dielectric microstrip generally needs to be electroplated, and then an outer conductor of a coaxial cable is welded on the electroplated cavity (or the reflection panel), to implement electrical connection between the outer conductor of the coaxial cable and the cavity (or the reflection panel); and an inner conductor of the coaxial cable is electrically connected to the air dielectric microstrip. The manufacturing and processing costs of the feeder device with this design are high.

In another existing design, a coaxial cable is coupled to a cavity (or a reflection panel). In this design, an inner conductor of the coaxial cable is generally electrically connected to an air dielectric microstrip, an outer conductor of the coaxial cable is welded on a printed circuit board (PCB), and a ground plane of the PCB and the cavity (or the reflection panel) form capacitive coupling, to implement grounding of the outer conductor of the coaxial cable, which results in inconsistent electrical properties of capacitive coupling and makes it difficult for mass production.

SUMMARY OF THE INVENTION

In view of the problems in the existing design that a device for transferring a signal between a coaxial cable and an air dielectric microstrip has inconsistent electrical properties and is unsuitable for mass production, this application provides an adapter device, a feeder device, and an antenna, in which a stable coupling connection can be realized in a non-flat capacitive coupling manner, thereby achieving consistent electrical properties, and making such devices suitable for mass production.

According to a first aspect, an adapter device is provided, including a coaxial cable, an air dielectric microstrip, a ground plane, and a non-flat metal part. An outer conductor of the coaxial cable is electrically connected to the non-flat metal part, the non-flat metal part and the ground plane form non-flat capacitive coupling, and an inner conductor of the coaxial cable is electrically connected to the air dielectric microstrip.

According to the adapter device in the first aspect, the inner conductor of the coaxial cable is electrically connected to the air dielectric microstrip, the outer conductor of the coaxial cable is electrically connected to the non-flat metal part, and the non-flat metal part and the ground plane form a non-flat capacitive coupling, so that the outer conductor of the coaxial cable is grounded. The non-flat capacitive coupling manner can realize a stable coupling connection, thereby achieving consistent electrical properties, and making such devices suitable for mass production.

It should be understood that the ground plane may be a cavity, a reflection panel, or a ground structure in another form. This is not limited in this application.

It should be further understood that the ground plane may be a non-electroplated device, and therefore the costs can be greatly reduced. In embodiments of this application, the outer conductor of the coaxial cable is electrically connected to the non-flat metal part, the non-flat metal part and the ground plane form non-flat capacitive coupling, and a radio frequency signal may be transmitted to the air dielectric microstrip through capacitive coupling, so that the ground plane (the cavity or the reflection panel) does not need to be electroplated. Alternatively, the ground plane may be an electroplated device. This is not limited in this application.

It should be further understood that the outer conductor of the coaxial cable may be welded to the non-flat metal part along an axial direction of the coaxial cable. To facilitate connection and assembly, a connection portion may be disposed on the non-flat metal part, so that the outer conductor of the coaxial cable can be more conveniently electrically connected to the connection portion by welding or in another manner, to implement the electrical connection between the outer conductor of the coaxial cable and the non-flat metal part. This is not limited in this application.

It should be further understood that adhesive may be filled between the non-flat metal part and the ground plane for fixing and insulating. Another material may be alternatively used for filling between the non-flat metal part and the ground plane for fixing and/or insulating. This is not limited in this application.

In a possible implementation of the first aspect, a first connection point at which the outer conductor of the coaxial cable is electrically connected to the non-flat metal part may be located at a middle portion of the non-flat capacitor in a length direction; or the first connection point at which the outer conductor of the coaxial cable is electrically connected to the non-flat metal part may be located at one of two ends of the non-flat capacitor in the length direction. Alternatively, the first connection point may be disposed at another position. This is not limited in this application.

A connection portion may be disposed at the first connection point on the non-flat metal part. The connection portion may be specifically a metal sheet with a hole at an end of the non-flat metal part, or may be another component having a clamping/clipping function. This is not limited in this application.

In a possible implementation of the first aspect, the first connection point may be disposed at a position that is on the coaxial cable and is close to a second connection point at which the inner conductor of the coaxial cable is electrically connected to the air dielectric microstrip. In other words, positions of the first connection point and the second connection point may be set as close as possible. It should be understood that as close as possible in this application means that, the positions of the first connection point and the second connection point are set as close as possible when a processing and/or assembly condition permits. For example, a distance between the first connection point and the second connection point may be less than or equal to 5 mm. This is not limited in this application. At a signal plane, current is formed between the first connection point and the second connection point; and at the ground plane, current in an opposite direction is formed between the first connection point and the second connection point. As a result, a current loop is formed between the first connection point and the second connection point. The positions of the first connection point and the second connection point are set as close as possible, so that performance of the feeder device can be improved, and performance of the antenna can be accordingly improved.

In a possible implementation of the first aspect, the non-flat capacitive coupling formed by the non-flat metal part and the ground plane may be non-flat multi-plane capacitive coupling. The multi-plane coupling may be, for example, three-plane coupling or four-plane coupling. However, this application is not limited thereto.

In several possible implementations of the first aspect, to adapt to a specific antenna structure, shapes, sizes, positions, and the like of components in the adapter device may have a plurality of forms, allowing the adapter device to be more flexibly used in the antenna structure.

In a possible implementation of the first aspect, the ground plane has a U-shaped groove structure, and the non-flat metal part is of a U-shaped structure.

In a possible implementation of the first aspect, the non-flat metal part and the ground plane form a U-shaped capacitive coupling, and the non-flat metal part of the U-shaped structure is sleeved (i.e. disposed around) about the outside of the coaxial cable. In this possible implementation, the problem of difficulty in mass production due to poor stability of capacitive coupling can be resolved. The U-shaped capacitive coupling (coupling in multiple planes) can ensure the coupling stability, that is, the U-shaped capacitor can ensure that the capacitance of the capacitor remains stable. In this way, the adapter device has consistent electrical properties and is suitable for mass production. When a material tolerance or an assembly tolerance is large, for example, when the non-flat metal part of the U-shaped structure clamped in the U-shaped groove structure of the ground plane shakes (e.g. moves or experiences movement) left and right, the U-shaped capacitive coupling structure can ensure that a sum of coupling gaps between two surfaces of the U-shaped sides of the non-flat metal part and the U-shaped groove structure of the ground plane remains unchanged, thereby ensuring that the capacitance of the U-shaped capacitor remains stable.

In a possible implementation of the first aspect, the non-flat metal part is disposed upside down on the U-shaped groove structure of the ground plane, and the coaxial cable is placed on a bottom surface of the non-flat metal part.

In a possible implementation of the first aspect, two U-shaped sides of the U-shaped structure of the non-flat metal part are disposed upside down with respect to, and cover, the outside of the U-shaped groove structure of the ground plane. In this possible implementation, the problem of difficulty in mass production due to poor stability of capacitive coupling can be resolved. Multi-plane capacitive coupling can ensure the coupling stability, that is, it can be ensured that the capacitance of the capacitor remains stable. In this way, the adapter device has consistent electrical properties and is suitable for mass production. When the non-flat metal part of the U-shaped structure is clamped on the cavity, and the non-flat metal part of the U-shaped structure shakes left and right, the sum of coupling gaps between the two surfaces of the U-shaped sides of the non-flat metal part and the U-shaped groove structure of the ground plane remains unchanged, thereby ensuring that the capacitance of the capacitor remains stable.

In a possible implementation of the first aspect, the ground plane is of a hollow square column structure, and the non-flat metal part is of a hollow square column structure.

The non-flat metal part may be disposed in the ground plane. The hollow square column structure of the non-flat metal part is placed in an inner cavity of the hollow square column structure of the cavity. In this possible implementation, the problem of difficulty in mass production due to poor stability of capacitive coupling can be resolved. Multi-plane capacitive coupling can ensure the coupling stability, that is, it can be ensured that the capacitance of the capacitor remains stable. In this way, the adapter device has consistent electrical properties and is suitable for mass production. When the non-flat metal part is clamped in the cavity, and the non-flat metal part shakes up, down, left, and right, a sum of coupling gaps between each surface of the non-flat metal part and each corresponding inner surface of the cavity remains unchanged. In this way, it can be ensured that the capacitance of the capacitor remains stable.

In a possible implementation of the first aspect, the ground plane is of a hollow square column structure, and the non-flat metal part is of a U-shaped structure. The non-flat metal part may be disposed in the ground plane, or the ground plane may be placed in the non-flat metal part.

In a possible implementation of the first aspect, the ground plane is of a hollow circular column structure, and the non-flat metal part is also of a hollow circular column structure. The non-flat metal part may be placed in the ground plane. In this possible implementation, the problem of difficulty in mass production due to poor stability of capacitive coupling can be resolved. The circular column capacitive coupling can ensure the coupling stability, meaning that the capacitance of the capacitor remains stable. In this way, the adapter device has consistent electrical properties and is suitable for mass production. When the non-flat metal part is clamped in the cavity, and the non-flat metal part shakes up, down, left, and right, an equivalent coupling gap between the non-flat metal part and the inner surface of the cavity remains unchanged. In this way, it can be ensured that the capacitance of the capacitor remains stable. Alternatively, the ground plane may be placed in the non-flat metal part. This is not limited in this application.

In a possible implementation of the first aspect, the non-flat metal part and the ground plane may form curved surface coupling other than the circular column coupling, for example, elliptical cylinder coupling; the ground plane may be of a hollow elliptical cylinder structure; and the non-flat metal part is also of a hollow elliptical cylinder structure.

According to a second aspect, a feeder device is provided, including a connector for inputting a radio frequency signal, a feeding line, and the adapter device according to any one of the first aspect and the possible implementations of the first aspect. The connector is electrically connected to the coaxial cable, and the feeding line is connected to the air dielectric microstrip.

According to a third aspect, an antenna is provided, including the feeder device according to the second aspect.

The antenna in the third aspect may be used on a network device, for example, a base station.

According to a fourth aspect, a base station (a network device) is provided, including the adapter device according to any one of the first aspect and the possible implementations of the first aspect, or the feeder device according to the second aspect, or the antenna according to the third aspect.

DETAILED DESCRIPTION OF ILLUSTRATIVE EMBODIMENTS

The following describes technical solutions of this application with reference to the accompanying drawings.

It should be noted that when an element is considered to be "connected" or "electrically connected" to another element, the element may be directly connected to the another element, or there may be an intermediate element. The terms "up", "down", "left", "right", and similar expressions used in this specification are merely for the purpose of illustration.

Adaptation between a coaxial cable and an air dielectric microstrip requires connection between an inner conductor of the coaxial cable and the air dielectric microstrip, that is, connection of a signal plane is implemented, and further requires connection between an outer conductor of the coaxial cable and a cavity (or a reflection panel), that is, connection of a ground plane is implemented. The adapter device in this application is a device for implementing adaptation between a coaxial cable and an air dielectric microstrip, and may be used in a scenario in which a radio frequency signal is transmitted from the coaxial cable to the air dielectric microstrip. The adapter device includes an inner conductor of the coaxial cable, an outer conductor of the coaxial cable, the air dielectric microstrip, and related parts of a ground plane. The adapter device may be a part of a feeder device/feeder system of an antenna, and may be used on a network device, for example, a base station. However, this application is not limited thereto.

Figure 1:
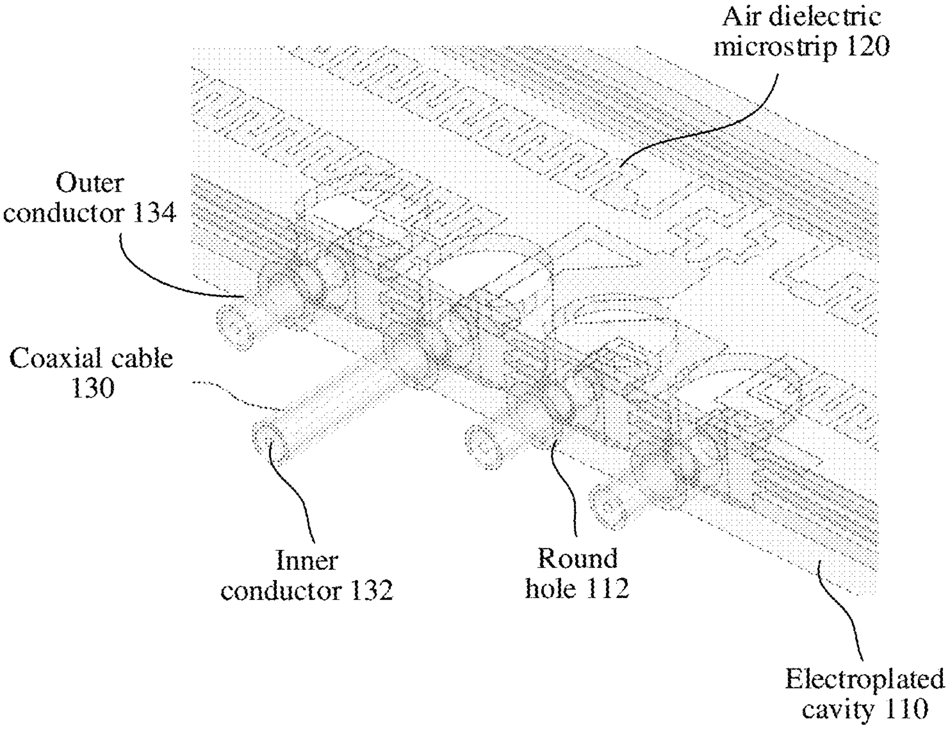
FIG. 1 is a schematic diagram of adaptation between a coaxial cable and an air dielectric microstrip accommodated in an electroplated cavity.

FIG. 1 is a schematic diagram of adaptation between a coaxial cable and an air dielectric microstrip accommodated in an electroplated cavity. A material of the cavity accommodating the air dielectric microstrip is generally aluminum. To weld an outer conductor of the coaxial cable with the cavity, the cavity needs to be electroplated (for example, tinned) to facilitate welding. As shown in FIG. 1, an electroplated cavity 110 accommodates an air dielectric microstrip 120, a coaxial cable 130 enters the electroplated cavity no through a round hole 112 on the cavity, and an inner conductor 132 of the coaxial cable 130 is directly electrically connected to the air dielectric microstrip (not specifically shown), for example, through welding. An outer conductor 134 of the coaxial cable 130 is electrically connected to the electroplated cavity 110 by welding at the round hole 112. Electroplating the cavity causes high costs of the antenna.

Figure 2:
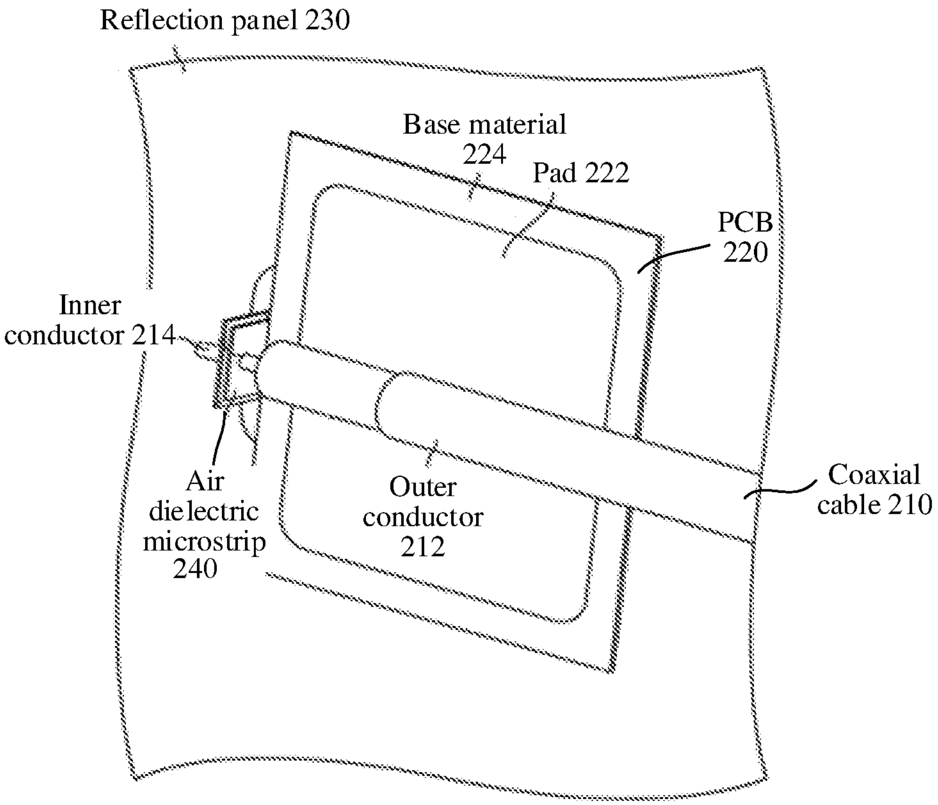
FIG. 2 is a schematic diagram of adaptation between a coaxial cable and an air dielectric microstrip placed on a reflection panel.

FIG. 2 is a schematic diagram of adaptation between a coaxial cable and an air dielectric microstrip placed on a reflection panel. As shown in FIG. 2, an outer conductor 212 of a coaxial cable 210 is welded on a printed circuit board (PCB) 220. The outer conductor 212 of the coaxial cable 210 is connected to a pad 222 of the PCB 220, and is connected to the ground of the PCB 220 by using a base material 224 (whose back surface is a ground plane) of the PCB 220, where the pad 222 of the PCB 220 is electrically connected to the ground plane of the PCB 220 by a plated via. The PCB 220 and a reflection panel 230 form capacitive coupling, to implement grounding of the outer conductor 212 of the coaxial cable 210. An inner conductor 214 of the coaxial cable 210 is electrically connected to an air dielectric microstrip 240. The PCB 220 and the reflection panel 230 form capacitive coupling. Since the PCB 220 and the reflection panel 230 may be deformed, a stable gap cannot be ensured between the PCB 220 and the large reflection panel 230, which makes it difficult for mass production and results in inconsistent electrical properties.

Based on the foregoing problem, this application provides an adapter device. The adapter device may be used in adaptation between a coaxial cable and an air dielectric microstrip.

Figure 3:
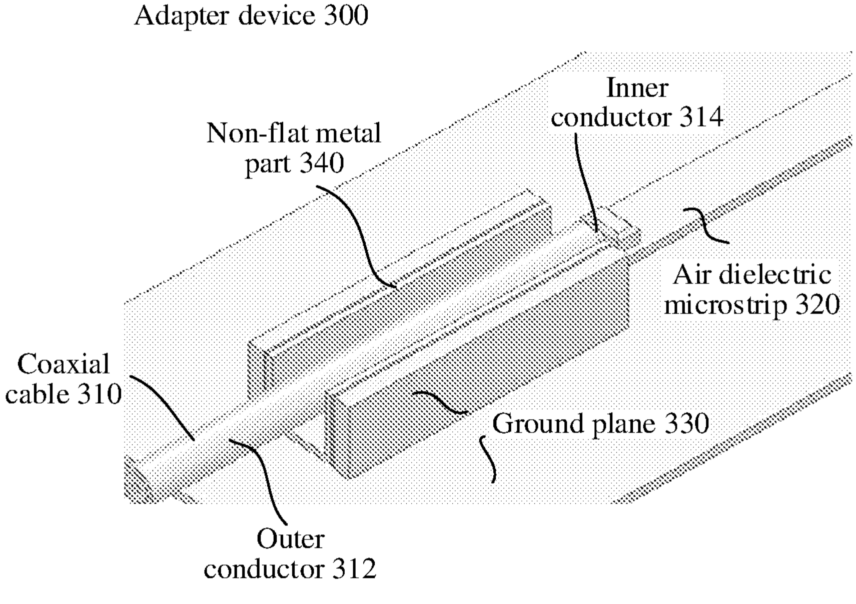
FIG. 3 is a schematic diagram of an adapter device according to an embodiment of this application.

FIG. 3 is a schematic diagram of an adapter device 300 according to an embodiment of this application. As shown in FIG. 3, the adapter device 300 may include a coaxial cable 310, an air dielectric microstrip 320, a ground plane 330, and a non-flat metal part 340. An outer conductor 312 of the coaxial cable 310 is electrically connected to the non-flat metal part 340, the non-flat metal part 340 and the ground plane 330 form non-flat capacitive coupling, and an inner conductor 314 of the coaxial cable 310 is electrically connected to the air dielectric microstrip 320.

In embodiments of this application, non-flat means not in a same plane. The non-flat metal part means that the metal part may have a plurality of portions that are not in a same plane, that is, the metal part has a plurality of surfaces; or the metal part may be curved or arc-shaped. The non-flat capacitor means that each electrode plate of the capacitor may have a plurality of portions that are not in a same plane, that is, each electrode plate has a plurality of surfaces; or each electrode plate of the capacitor may be curved or arc-shaped. For example, the non-flat capacitor may be a U-shaped capacitor (three-plane coupling), a square columnar capacitor (four-plane coupling), a cylindrical capacitor (curved surface coupling), or the like, but is not limited thereto. The non-flat may be a combination of three surfaces, a combination of four surfaces, a curved surface, an arc surface, or the like, but is not limited thereto.

In embodiments of this application, capacitive coupling may also be referred to as capacitive coupling, electric field coupling, or electrostatic coupling, which intends to achieve signal transmission through the coupling manner of forming capacitors.

In embodiments of this application, the ground plane may be a cavity or a reflection panel. In the following embodiments of this application, there are specific embodiments in which the ground plane is a cavity or the ground plane is a reflection panel. Alternatively, the ground plane may be a ground structure in another form. This is not limited in this application. The cavity or the reflection panel may be made of a metal material, for example, aluminum, or may be made of another material. This is not limited in this application.

The ground plane in embodiments of this application may be a non-electroplated device, and therefore the costs can be greatly reduced. In embodiments of this application, the outer conductor of the coaxial cable is electrically connected to the non-flat metal part, the non-flat metal part and the ground plane form non-flat capacitive coupling, and a radio frequency signal may be transmitted to the air dielectric microstrip through capacitive coupling, so that the ground plane (the cavity or the reflection panel) does not need to be electroplated. Certainly, the ground plane in embodiments of this application may be alternatively an electroplated device. This is not limited in this application.

In embodiments of this application, the inner conductor of the coaxial cable and the air dielectric microstrip may be electrically connected through welding, or may be electrically connected in another manner, for example, electrically connected by crimping, winding, or screw (cap) fastening. This is not limited in this application.

In embodiments of this application, the outer conductor of the coaxial cable and the non-flat metal part may be electrically connected through welding, or may be electrically connected in another manner, for example, electrically connected by crimping, winding, or screw (cap) fastening. This is not limited in this application.

In embodiments of this application, the outer conductor of the coaxial cable may be electrically connected along an axial direction of the coaxial cable, for example, welded to the non-flat metal part. The electrical connection may be connection in a point-based manner (for example, welding at a point), may be connection in a line-based manner (for example, welding along a line), or may be connection in a plane-based manner (for example, welding in a wide area). To facilitate connection and assembly, a connection portion may be disposed on the non-flat metal part, so that the outer conductor of the coaxial cable can be more conveniently welded to the connection portion, to implement the electrical connection between the outer conductor of the coaxial cable and the non-flat metal part. The connection portion may also be disposed for connection in a point-based manner or in a line-based or plane-based manner. This is not limited in this application.

In embodiments of this application, adhesive may be filled between the non-flat metal part and the ground plane for fixing and insulating. Certainly, another material may be alternatively used for filling, for fixing and/or insulating. This is not limited in this application.

According to the adapter device provided in this application, the inner conductor of the coaxial cable is electrically connected to the air dielectric microstrip, the outer conductor of the coaxial cable is electrically connected to the non-flat metal part, and the non-flat metal part and the ground plane form non-flat capacitive coupling, so that the outer conductor of the coaxial cable is grounded. The non-flat capacitive coupling manner can realize stable coupling connection, thereby achieving consistent electrical properties, and making it suitable for mass production.

The non-flat capacitor structure has coupling in several planes (multi-plane coupling) or curved surface/arc surface coupling. When the non-flat capacitor structure shakes, some parts of capacitance formed between surfaces or curved surfaces of the non-flat capacitor increase, and some parts decrease. However, a total capacitance remains unchanged or changes slightly, which facilitates stability and ensures consistent electrical properties. The stability ensures that the requirements for processing and assembly are naturally reduced, which facilitates mass production.

The position at which the outer conductor of the coaxial cable is electrically connected to the non-flat metal part is not limited in embodiments of this application.

In some embodiments of this application, a first connection point at which the outer conductor of the coaxial cable is electrically connected to the non-flat metal part may be located at a middle portion of the non-flat capacitor in a length direction. It should be understood that the middle portion is a point or a segment within a distance in the middle of the non-flat capacitor in the length direction. This is not limited in this application. In a specific example, a connection portion may be disposed at the first connection point on the non-flat metal part.

In some other embodiments of this application, the first connection point at which the outer conductor of the coaxial cable is electrically connected to the non-flat metal part may be located at one of two ends of the non-flat capacitor in the length direction. In a specific example, a connection portion may be disposed at the first connection point on the non-flat metal part.

Alternatively, the first connection point may be disposed at another position. This is not limited in this application.

Figure 4:
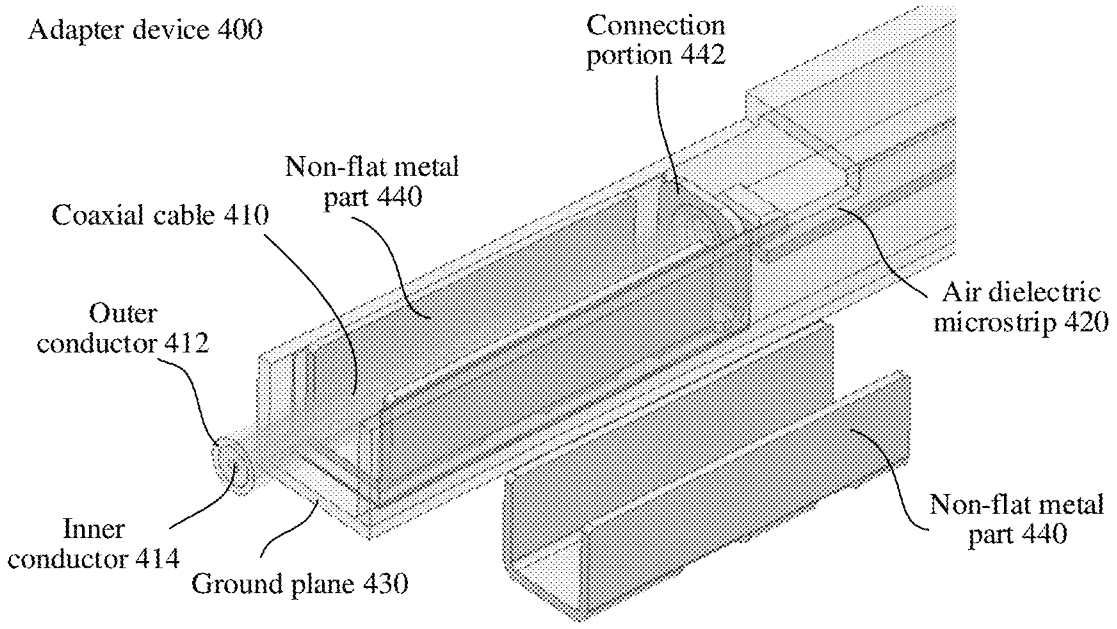
FIG. 4 is a schematic diagram of an adapter device according to another embodiment of this application.

FIG. 4 is a schematic diagram of an adapter device 400 according to another embodiment of this application, where the adapter device is provided with a connection portion at a first connection point. As shown in FIG. 4, the adapter device 400 may include a coaxial cable 410, an air dielectric microstrip 420, a ground plane 430 (which is a cavity in FIG. 4), and a non-flat metal part 440. An inner conductor 414 of the coaxial cable 410 is electrically connected to the air dielectric microstrip 420. An outer conductor 412 of the coaxial cable 410 is electrically connected to the non-flat metal part 440, and the non-flat metal part 440 and the ground plane 430 form non-flat capacitive coupling. A first connection point at which the outer conductor 412 of the coaxial cable 410 is electrically connected to the non-flat metal part 440 may be located at one of two ends of a non-flat capacitor in the length direction. A connection portion 442 is disposed at the first connection point between the outer conductor 412 of the coaxial cable 410 and the non-flat metal part 440 shown in FIG. 4.

The first connection point (the connection portion 442) between the outer conductor 412 of the coaxial cable 410 in the adapter device 400 shown in FIG. 4 and the non-flat metal part 440 is at an end close to a second connection point between the inner conductor 414 of the coaxial cable 410 and the air dielectric microstrip 420, that is, a right end of the non-flat capacitor in the length direction. In another embodiment, the first connection point may be located at the other end of the non-flat capacitor in the length direction, that is, a left end of the non-flat capacitor in the length direction, which is the end away from the connection point between the inner conductor 414 of the coaxial cable 410 and the air dielectric microstrip 420. The first connection point is disposed at one of the two ends of the non-flat capacitor in the length direction. Certainly, in another embodiment of this application, the first connection point may not be limited to being disposed at one of the two ends of the non-flat capacitor in the length direction, and the first connection point may be located at a middle portion of the non-flat capacitor in the length direction. This is not limited in this application.

The connection portion may be specifically a metal sheet with a hole at an end of the non-flat metal part. The outer conductor of the coaxial cable may be electrically connected to the metal sheet, for example, connected through welding. The inner conductor of the coaxial cable may be electrically connected to the air dielectric microstrip through the hole on the metal sheet. Alternatively, the connection portion may be another component having a clamping/clipping function. This is not limited in this application. In another embodiment of this application, no connection portion may alternatively be disposed at the first connection point, and the outer conductor of the coaxial cable is directly connected to the non-flat metal part. This is not limited in this application.

In some embodiments of this application, the first connection point may be disposed at a position that is on the coaxial cable and is close to a second connection point at which the inner conductor of the coaxial cable is electrically connected to the air dielectric microstrip. In other words, positions of the first connection point and the second connection point may be set as close as possible. It should be understood that as close as possible in this application means that when a processing and/or assembly condition permits, the positions of the first connection point and the second connection point are set as close as possible. For example, a distance between the first connection point and the second connection point may be less than or equal to 5 mm. Alternatively, for example, the distance between the first connection point and the second connection point may be less than or equal to 1/10 of the length of the non-flat metal part. This is not limited in this application. At a signal plane (which is a plane formed by the electrical connection between the inner conductor of the coaxial cable and the air dielectric microstrip), current is formed between the first connection point and the second connection point; and at the ground plane (which is a plane to which the outer conductor of the coaxial cable is connected), current in an opposite direction is formed between the first connection point and the second connection point. As a result, a current loop is formed between the first connection point and the second connection point. The positions of the first connection point and the second connection point are set as close as possible, so that performance of the feeder device can be improved, and performance of the antenna can be accordingly improved.

In embodiments of this application, to adapt to a specific antenna structure, shapes, sizes, positions, and the like of components in the adapter device may have a plurality of forms, allowing the adapter device to be more flexibly used in the antenna structure. FIG. 5 to FIG. 10 are some specific examples of different forms, but the structure of the adapter device in this application is not limited to the structures in these figures.

In some embodiments of this application, the non-flat capacitive coupling formed by the non-flat metal part and the ground plane may be non-flat multi-plane capacitive coupling. The multi-plane coupling refers to the formation of coupling in a plurality of planes, and may be, for example, three-plane coupling or four-plane coupling. However, this application is not limited thereto.

In some specific embodiments of this application, the ground plane has a U-shaped groove structure, and the non-flat metal part is of a U-shaped structure. The non-flat metal part and the ground plane form U-shaped capacitive coupling, and the non-flat metal part of the U-shaped structure is sleeved outside the coaxial cable. In other words, the non-flat metal part of the U-shaped structure is embedded into the U-shaped groove structure of the ground plane to form a U-shaped capacitor (form a capacitor with three-plane coupling), and the non-flat metal part of the U-shaped structure is sleeved outside the coaxial cable. The adapter devices shown in FIG. 3 and FIG. 4 are both of the foregoing structure. The ground plane may be a cavity having a U-shaped groove structure shown in FIG. 4, or may be a reflection panel having a U-shaped groove structure.

Figure 5:
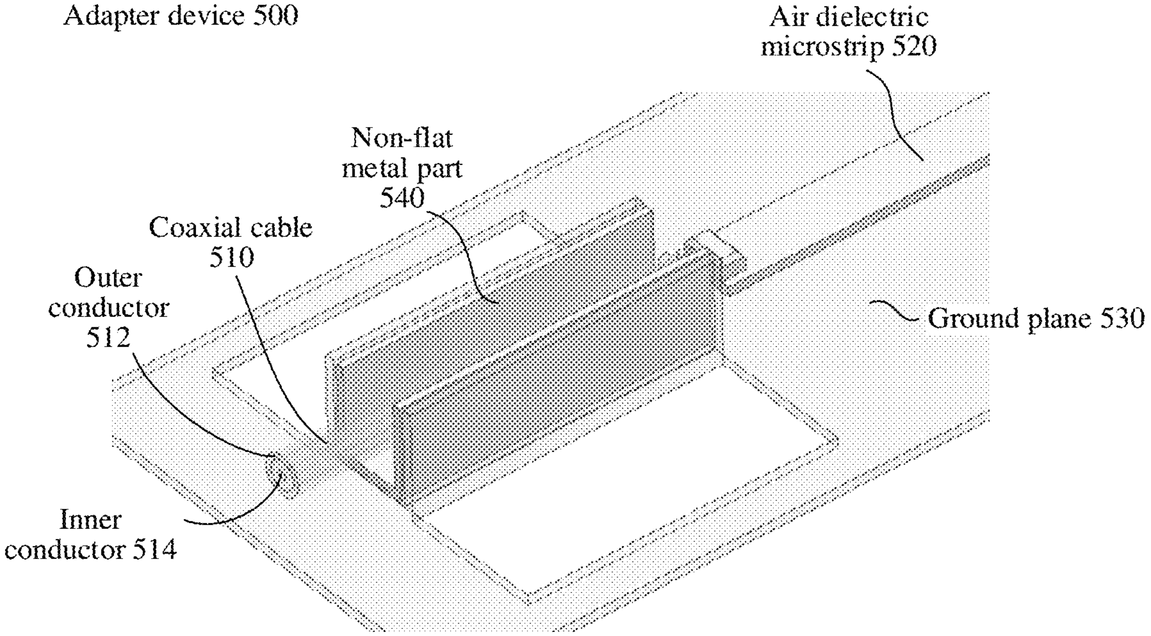
FIG. 5 is a schematic diagram of an adapter device according to another embodiment of this application.

FIG. 5 is a schematic diagram of an adapter device 500 according to another embodiment of this application. FIG. 5 shows an example of forming U-shaped capacitive coupling by a non-flat metal part and a ground plane in the adapter device. As shown in FIG. 5, the adapter device 500 may include a coaxial cable 510, an air dielectric microstrip 520, a ground plane 530 (where the ground plane in FIG. 5 is a reflection panel, and the reflection panel forms a U-shaped groove structure through bending), and a non-flat metal pall 540. An inner conductor 514 of the coaxial cable 510 is electrically connected to the air dielectric microstrip 520. An outer conductor 512 of the coaxial cable 510 is electrically connected to the non-flat metal part 540, and the non-flat metal part 540 and the ground plane 530 form non-flat capacitive coupling having three-plane coupling.

When a material tolerance or an assembly tolerance is large, for example, when the non-flat metal part of the U-shaped structure clamped in the U-shaped groove structure of the ground plane shakes left and right, the U-shaped capacitive coupling structure can ensure that a sum of coupling gaps between two surfaces of the U-shaped sides of the non-flat metal part and the U-shaped groove structure of the ground plane remains unchanged or changes slightly, which can ensure that the capacitance of the U-shaped capacitor remains stable, thereby ensure the stability of capacitive coupling. In this way, the adapter device has consistent electrical properties and is suitable for mass production.

In addition, a first connection point at which the outer conductor 512 of the coaxial cable 510 is electrically connected to the non-flat metal part 540 may be located at a right end of the non-flat capacitor in a length direction, or may be located at a left end or a middle portion of the non-flat capacitor in the length direction. This is not limited in this application.

In some specific embodiments of this application, the ground plane has a U-shaped groove structure, and the non-flat metal part is of a U-shaped structure. The non-flat metal part is disposed upside down on the U-shaped groove structure of the ground plane, and the coaxial cable is placed on a bottom surface of the non-flat metal part.

Figure 6:
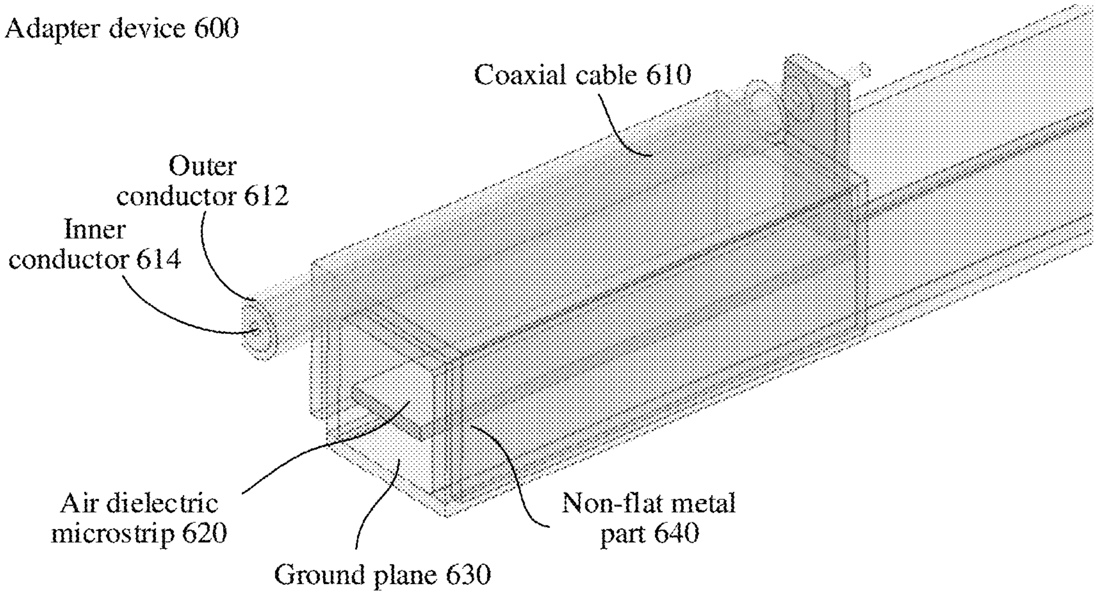
FIG. 6 is a schematic diagram of an adapter device according to another embodiment of this application.

FIG. 6 is a schematic diagram of an adapter device 600 according to another embodiment of this application. Different from FIG. 5, FIG. 6 shows an example in which both a non-flat metal part and a ground plane in the adapter device are of a U-shaped structure and disposed upside down on each other to form capacitive coupling. Embodiments of this application may be flexibly applied to various different antenna structures. In FIG. 6, a coaxial cable and an air dielectric microstrip are located on a same side of a second connection point (which is a connection point between an inner conductor of the coaxial cable and the air dielectric microstrip). For example, both the coaxial cable and the air dielectric microstrip shown in FIG. 6 are located on a left side of the second connection point. As shown in FIG. 6, the adapter device 600 may include a coaxial cable 610, an air dielectric microstrip 620, a ground plane 630 (which is a cavity in FIG. 6), and a non-flat metal part 640. An inner conductor 614 of the coaxial cable 610 is electrically connected to the air dielectric microstrip 620. An outer conductor 612 of the coaxial cable 610 is electrically connected to the non-flat metal part 640, and the non-flat metal part 640 and the ground plane 630 form non-flat capacitive coupling. As shown in FIG. 6, the ground plane 630 has a U-shaped groove structure, and the non-flat metal part 640 is of a U-shaped structure. The non-flat metal part 640 is disposed upside down on the U-shaped groove structure of the ground plane 630, and the coaxial cable 610 is placed on a bottom surface of the non-flat metal part 640.

Specifically, the outer conductor 612 of the coaxial cable 610 and the non-flat metal part 640 of the U-shaped structure may be welded to each other at an end close to the second connection point between the inner conductor 614 of the coaxial cable 610 and the air dielectric microstrip 620. The non-flat metal part 640 of the U-shaped structure is placed across a narrow edge of the cavity to form a capacitor with three-plane coupling. The coaxial cable 610 is placed on the bottom surface (not the two surfaces of the U-shaped sides) of the non-flat metal part 640 of the U-shaped structure. The inner conductor 614 of the coaxial cable 610 is welded to the air dielectric microstrip 620, where a connecting component may be disposed for ease of welding. In the adapter device shown in FIG. 6, the two U-shaped sides of the U-shaped structure of the non-flat metal part 640 are disposed upside down and cover outside the U-shaped groove structure of the ground plane 630 (the cavity).

When the non-flat metal part 640 of the U-shaped structure is clamped on the cavity, and the non-flat metal part 640 of the U-shaped structure shakes left and right, the sum of coupling gaps between the two surfaces of the U-shaped sides of the non-flat metal part and the U-shaped groove structure of the ground plane remains unchanged or changes slightly, which can ensure that the capacitance of the U-shaped capacitor remains stable, thereby ensure the stability of capacitive coupling. In this way, the adapter device has consistent electrical properties and is suitable for mass production.

In addition, a first connection point at which the outer conductor 612 of the coaxial cable 610 is electrically connected to the non-flat metal part 640 may be located at a right end of the non-flat capacitor in a length direction, or may be located at a left end or a middle portion of the non-flat capacitor in the length direction. This is not limited in this application.

Figure 7:
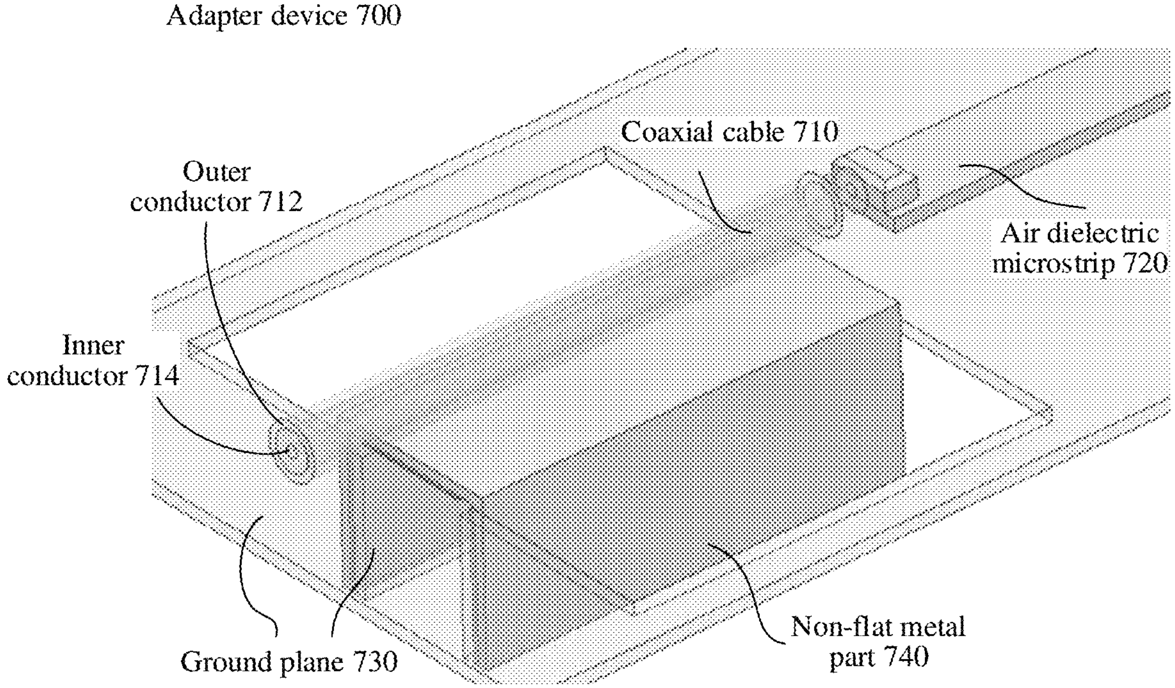
FIG. 7 is a schematic diagram of an adapter device according to another embodiment of this application.

FIG. 7 is a schematic diagram of an adapter device 700 according to another embodiment of this application. Different from FIG. 6, FIG. 7 also shows an example in which both a non-flat metal part and a ground plane in the adapter device are of a U-shaped structure and disposed upside down on each other to form capacitive coupling. However, a coaxial cable and an air dielectric microstrip are located on different sides of a second connection point. For example, the coaxial cable shown in FIG. 7 is located on a left side of the second connection point, and the air dielectric microstrip is located on a right side of the second connection point. As shown in FIG. 7, the adapter device 700 may include a coaxial cable 710, an air dielectric microstrip 720, a ground plane 730 (where the ground plane in FIG. 7 is a reflection panel, and the reflection panel forms a U-shaped groove structure through bending), and a non-flat metal part 740. An inner conductor 714 of the coaxial cable 710 is electrically connected to the air dielectric microstrip 720. An outer conductor 712 of the coaxial cable 710 is electrically connected to the non-flat metal part 740, and the non-flat metal part 740 and the ground plane 730 form non-flat capacitive coupling. The two U-shaped sides of the U-shaped structure of the non-flat metal part 740 are disposed upside down and cover outside the U-shaped groove structure of the ground plane 730 (the reflection panel). When the non-flat metal part 740 of the U-shaped structure is clamped outside the U-shaped groove structure of the reflection panel, and the non-flat metal part 740 of the U-shaped structure shakes left and right, the sum of coupling gaps between the two surfaces of the U-shaped sides of the non-flat metal part and the U-shaped groove structure of the reflection panel remains unchanged or changes slightly, which can ensure that the capacitance of the U-shaped capacitor remains stable, thereby ensure the stability of capacitive coupling. In this way, the adapter device has consistent electrical properties and is suitable for mass production.

In another embodiment of this application, one U-shaped side of the U-shaped structure of the non-flat metal part may be disposed upside down in the U-shaped groove structure of the ground plane. Alternatively, the two U-shaped sides of the U-shaped structure of the non-flat metal part may both be disposed upside down in the U-shaped groove structure of the ground plane. This is not limited in this application.

In addition, a first connection point at which the outer conductor 712 of the coaxial cable 710 is electrically connected to the non-flat metal part 740 may be located at a right end of the non-flat capacitor in a length direction, or may be located at a left end or a middle portion of the non-flat capacitor in the length direction. This is not limited in this application.

In some specific embodiments of this application, the ground plane is of a hollow square column structure, and the non-flat metal part is of a hollow square column structure. The non-flat metal part is placed in the ground plane, that is, the hollow square column structure of the non-flat metal part is placed in the ground plane (the cavity) of the hollow square column structure.

Figure 8:
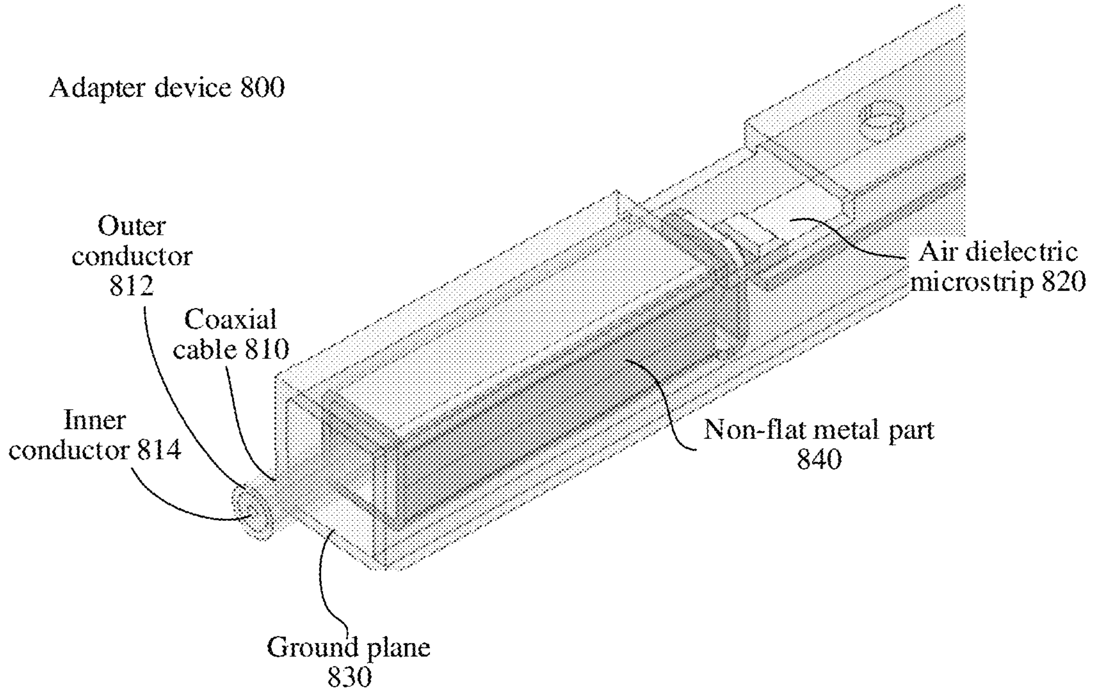
FIG. 8 is a schematic diagram of an adapter device according to another embodiment of this application.

FIG. 8 is a schematic diagram of an adapter device 800 according to another embodiment of this application. FIG. 8 shows an example in which a ground plane is of a hollow square column structure, a non-flat metal part is of a hollow square column structure, and both are sleeved to form a capacitive coupling, where the ground plane of the hollow square column structure surrounds the hollow square column structure of the non-flat metal part. As shown in FIG. 8, the adapter device 800 may include a coaxial cable 810, an air dielectric microstrip 820, a ground plane 830 (which is a cavity in FIG. 8), and a non-flat metal part 840. An inner conductor 814 of the coaxial cable 810 is electrically connected to the air dielectric microstrip 820. An outer conductor 812 of the coaxial cable 810 is electrically connected to the non-flat metal part 840, and the non-flat metal part 840 and the ground plane 830 form non-flat capacitive coupling. The hollow square column structure of the non-flat metal part 840 is placed in an inner cavity of the hollow square column structure of the cavity. When the non-flat metal part 840 is clamped in the cavity, and the non-flat metal part 840 shakes up, down, left, and right, a sum of coupling gaps between each surface of the non-flat metal part and each corresponding inner surface of the cavity remains unchanged or changes slightly, which can ensure that the capacitance of the capacitor remains stable, thereby ensure the stability of capacitive coupling. In this way, the adapter device has consistent electrical properties and is suitable for mass production.

In addition, a first connection point at which the outer conductor 812 of the coaxial cable 810 is electrically connected to the non-flat metal part 840 may be located at a right end of the non-flat capacitor in a length direction, or may be located at a left end or a middle portion of the non-flat capacitor in the length direction. This is not limited in this application.

In some specific embodiments of this application, the ground plane is of a hollow square column structure, and the non-flat metal part is of a hollow square column structure; or the ground plane is of a hollow square column structure, and the non-flat metal part is of a U-shaped structure. The ground plane is placed in the non-flat metal part, that is, the hollow square column structure or the U-shaped structure of the non-flat metal part surrounds the ground plane (the cavity) of the hollow square column structure.

Figure 9:
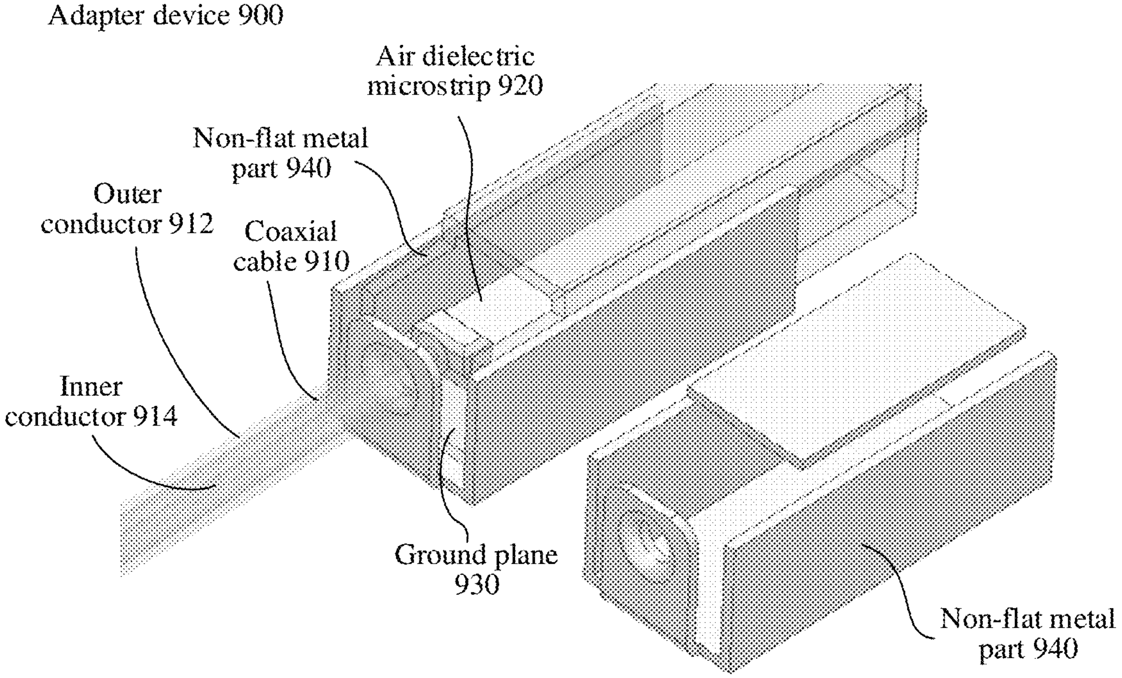
FIG. 9 is a schematic diagram of an adapter device according to another embodiment of this application.

FIG. 9 is a schematic diagram of an adapter device 900 according to another embodiment of this application. Different from FIG. 8, FIG. 9 shows an example in which the ground plane is of a hollow square column structure, the non-flat metal part is of a hollow square column structure or a U-shaped structure, and both are sleeved to form capacitive coupling. However, the hollow square column structure of the non-flat metal part surrounds the ground plane of the hollow square column structure. As shown in FIG. 9, the adapter device 900 may include a coaxial cable 910, an air dielectric microstrip 920, a ground plane 930 (which is a cavity in FIG. 9), and a non-flat metal part 940. An inner conductor 914 of the coaxial cable 910 is electrically connected to the air dielectric microstrip 920. An outer conductor 912 of the coaxial cable 910 is electrically connected to the non-flat metal part 940, and the non-flat metal part 940 and the ground plane 930 form non-flat capacitive coupling. The hollow square column structure of the non-flat metal part 940 surrounds the hollow square column structure of the cavity. When the non-flat metal part 940 surrounds the cavity, and the non-flat metal part 940 shakes left and right, a sum of coupling gaps between each surface of the non-flat metal part and each corresponding outer surface of the cavity remains unchanged, which can ensure that the capacitance of the capacitor remains stable, thereby ensure the stability of capacitive coupling. In this way, the adapter device has consistent electrical properties and is suitable for mass production.

In this embodiment, the hollow square column structure of the non-flat metal part 940 may be a closed square column, or may be a non-closed square column (for example, the non-flat metal part 940 shown in FIG. 9 does not have an upper surface). Non-closed square columns are easier to process and assemble. When the non-flat metal part 940 shown in FIG. 9 does not have an upper surface, the U-shaped structure of the non-flat metal part may surround the cavity of the hollow square column structure.

In addition, a first connection point at which the outer conductor 912 of the coaxial cable 910 is electrically connected to the non-flat metal part 940 may be located at a left end of the non-flat capacitor in a length direction, or may be located at a right end or a middle portion of the non-flat capacitor in the length direction. This is not limited in this application.

In some embodiments of this application, the non-flat metal part may be alternatively another multi-plane cylinder, for example, a triangular prism, a pentagonal prism, a hexagonal prism, or another cylinder. A corresponding groove, protrusion, or the like that matches the shape of the non-flat metal part may be disposed on the ground plane, so that the non-flat metal part and the ground plane form non-flat multi-plane capacitive coupling. This is not limited in this application.

In some embodiments of this application, the non-flat capacitive coupling formed by the non-flat metal part and the ground plane may be arc-shaped or curved capacitive coupling, for example, elliptical cylinder coupling. The ground plane may be of a hollow elliptical cylinder structure, and the non-flat metal part is also of a hollow elliptical cylinder structure.

In some specific embodiments of this application, the ground plane is of a hollow circular column structure, and the non-flat metal part is also of a hollow circular column structure. The non-flat metal part is placed in the ground plane, that is, the hollow circular column structure of the non-flat metal part is placed in the ground plane (the cavity) of the hollow circular column structure.

Figure 10:
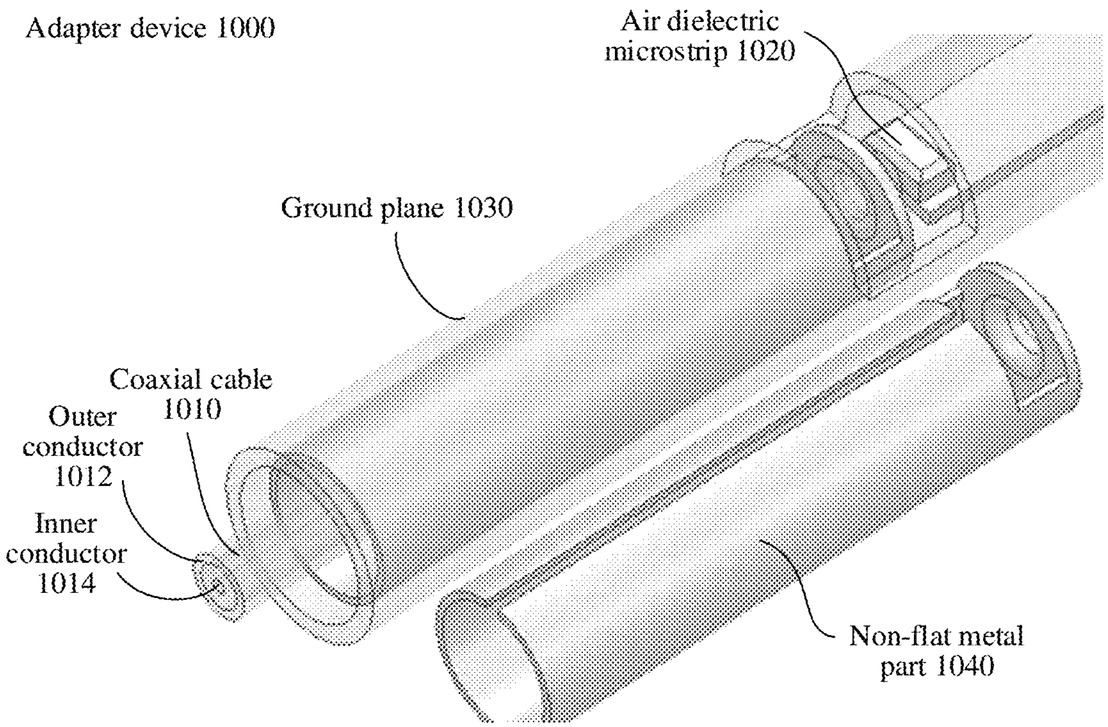
FIG. 10 is a schematic diagram of an adapter device according to another embodiment of this application.

FIG. 10 is a schematic diagram of an adapter device 1000 according to another embodiment of this application. Different from the square column structure or the U-shaped structure in the embodiments corresponding to the foregoing accompanying drawings, FIG. 10 shows an example in which the ground plane is of a hollow circular column structure, the non-flat metal part is of a hollow circular column structure, and both are sleeved to form capacitive coupling. As shown in FIG. 10, the adapter device 1000 may include a coaxial cable 1010, an air dielectric microstrip 1020, a ground plane 1030 (which is a cavity in FIG. 10), and a non-flat metal part 1040. An inner conductor 1014 of the coaxial cable 1010 is electrically connected to the air dielectric microstrip 1020. An outer conductor 1012 of the coaxial cable 1010 is electrically connected to the non-flat metal part 1040, and the non-flat metal part 1040 and the ground plane 1030 form non-flat capacitive coupling. The hollow circular column structure of the non-flat metal part 1040 is placed in an inner cavity of the hollow circular column structure of the cavity. When the non-flat metal part 1040 is clamped in the cavity, and the non-flat metal part 1040 shakes up, down, left, and right, an equivalent coupling gap between the non-flat metal part 1040 and the inner surface of the cavity remains unchanged or changes slightly, which can ensure that the capacitance of the capacitor remains stable, thereby ensure the stability of capacitive coupling. In this way, the adapter device has consistent electrical properties and is suitable for mass production.

In this embodiment, the hollow circular column structure of the non-flat metal part 1040 may be a closed circular column, or a non-closed circular column with a slit shown in FIG. 10. Non-closed circular columns are easier to process and assemble.

In addition, a first connection point at which the outer conductor 1012 of the coaxial cable 1010 is electrically connected to the non-flat metal part 1040 may be located at a right end of the non-flat capacitor in a length direction, or may be located at a left end or a middle portion of the non-flat capacitor in the length direction. This is not limited in this application.

In some other specific embodiments of this application, the ground plane is of a hollow circular column structure, and the non-flat metal part is also of a hollow circular column structure. The ground plane is placed in the non-flat metal part, that is, the hollow circular column structure of the non-flat metal part surrounds the ground plane (the cavity) of the hollow circular column structure, which is not shown in the drawings again.

This application further provides a feeder device, including a connector for inputting a radio frequency signal, a feeding line, and the adapter device described above, where the connector is electrically connected to the coaxial cable, and the feeding line is connected to the air dielectric microstrip.

This application further provides an antenna, including the feeder device described above.

The antenna may be used on a network device, for example, a base station.

This application further provides a base station (a network device), including the adapter device in this application, or the feeder device in this application, or the antenna in this application.

It should be understood that various numbers in this specification are merely used for differentiation for ease of description, and are not used to limit the scope of this application.

The technical features of the foregoing embodiments may be combined randomly. For brevity of description, not all possible combinations of the technical features in the foregoing embodiments are described. However, as long as no conflict exists between the combinations of the technical features, it should be considered that the technical features fall within the scope of the disclosure of this specification.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An adapter device, comprising:

a coaxial cable;

an air dielectric microstrip;

a non-flat ground plane; and a non-flat metal part, wherein an outer conductor of the coaxial cable is electrically connected to the non-flat metal part, the non-flat metal part and the non-flat ground plane form a non-flat capacitive coupling, and an inner conductor of the coaxial cable is electrically connected to the air dielectric microstrip.

2. The adapter device according to claim 1, wherein a first connection point at which the outer conductor of the coaxial cable is electrically connected to the non-flat metal part is located at one of two ends of the non-flat capacitive coupling in a length direction or at a middle portion of the non-flat capacitive coupling in the length direction.

3. The adapter device according to claim 2, wherein a connection portion is disposed at the first connection point on the non-flat metal part.

4. The adapter device according to claim 2, wherein the first connection point is disposed at a position on the coaxial cable that is close to a second connection point at which the inner conductor of the coaxial cable is electrically connected to the air dielectric microstrip.

5. The adapter device according to claim 1, wherein the non-flat metal part and the non-flat ground plane form a non-flat multi-plane capacitive coupling.

6. The adapter device according to claim 1, wherein the non-flat ground plane has a U-shaped groove structure, and the non-flat metal part is of a U-shaped structure.

7. The adapter device according to claim 6, wherein the non-flat metal part and the non-flat ground plane form a U-shaped capacitive coupling, and the non-flat metal part of the U-shaped structure is disposed around an outside of the coaxial cable.

8. The adapter device according to claim 6, wherein the non-flat metal part is disposed on the U-shaped groove structure of the non-flat ground plane upside down with respect to the U-shaped groove structure of the non-flat ground plane, and the coaxial cable is placed on a bottom surface of the non-flat metal part.

9. The adapter device according to claim 8, wherein two U-shaped sides of the U-shaped structure of the non-flat metal part are disposed upside down with respect to the U-shaped groove structure of the non-flat ground plane, and cover outside of the U-shaped groove structure of the non-flat ground plane.

10. The adapter device according to claim 1, wherein the non-flat ground plane is a hollow square column structure, and the non-flat metal part is a hollow square column structure.

11. The adapter device according to claim 10, wherein the non-flat metal part is placed in the non-flat ground plane.

12. The adapter device according to claim 10, wherein the non-flat ground plane is placed in the non-flat metal part.

13. The adapter device according to claim 1, wherein the non-flat ground plane is a hollow square column structure, and the non-flat metal part is a U-shaped structure.

14. The adapter device according to claim 1, wherein the non-flat ground plane is a hollow circular column structure, and the non-flat metal part is a hollow circular column structure.

15. The adapter device according to claim 1, wherein the non-flat ground plane is a non-electroplated device.

16. A feeder device, comprising:

a coaxial cable, and an adapter device comprising:

an air dielectric microstrip;

a non-flat ground plane; and a non-flat metal part, wherein an outer conductor of the coaxial cable is electrically connected to the non-flat metal part, the non-flat metal part and the non-flat ground plane form a non-flat capacitive coupling, and an inner conductor of the coaxial cable is electrically connected to the air dielectric microstrip.

17. The feeder device according to claim 16, wherein a first connection point at which the outer conductor of the coaxial cable is electrically connected to the non-flat metal part is located at one of two ends of the non-flat capacitive coupling in a length direction or at a middle portion of the non-flat capacitive coupling in the length direction.

18. The feeder device according to claim 17, wherein a connection portion is disposed at the first connection point on the non-flat metal part.

19. The feeder device according to claim 17, wherein the first connection point is disposed at a position on the coaxial cable that is close to a second connection point at which the inner conductor of the coaxial cable is electrically connected to the air dielectric microstrip.

20. The feeder device according to claim 16, wherein the non-flat metal part and the non-flat ground plane form a non-flat multi-plane capacitive coupling.

* * * * *